March 31, 1931.  S. P. HAYNES ET AL  1,798,603
AUTOMOBILE TRAFFIC SIGNAL SWITCH
Filed May 25, 1927   2 Sheets-Sheet 1
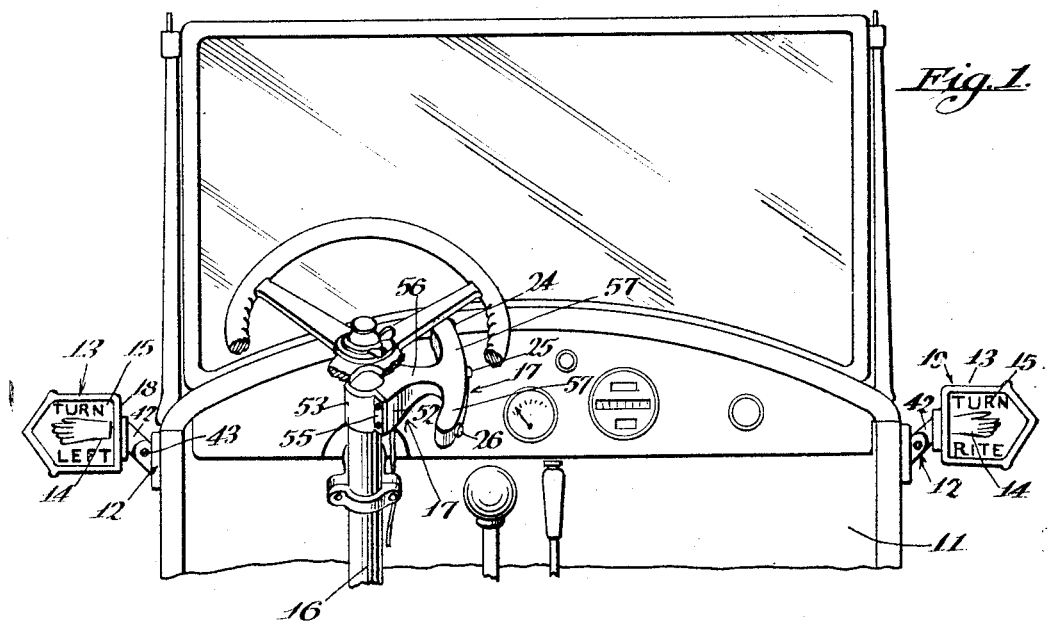
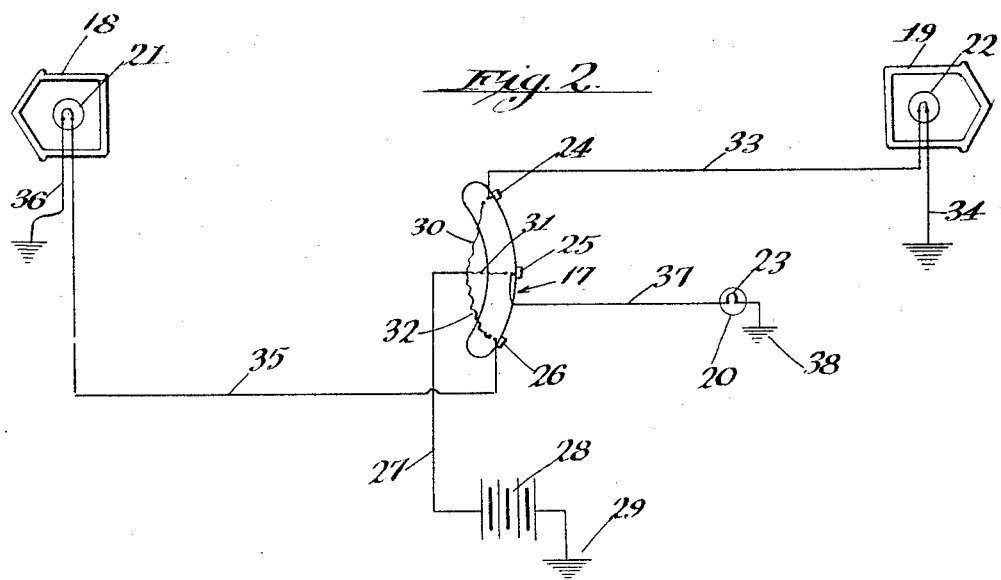
Inventors
Samuel P. Haynes
Harry Butcher
by Hazard and Miller
Attorneys March 31, 1931.  S. P. HAYNES ET AL  1,798,603
AUTOMOBILE TRAFFIC SIGNAL SWITCH
Filed May 25, 1927  2 Sheets-Sheet 2
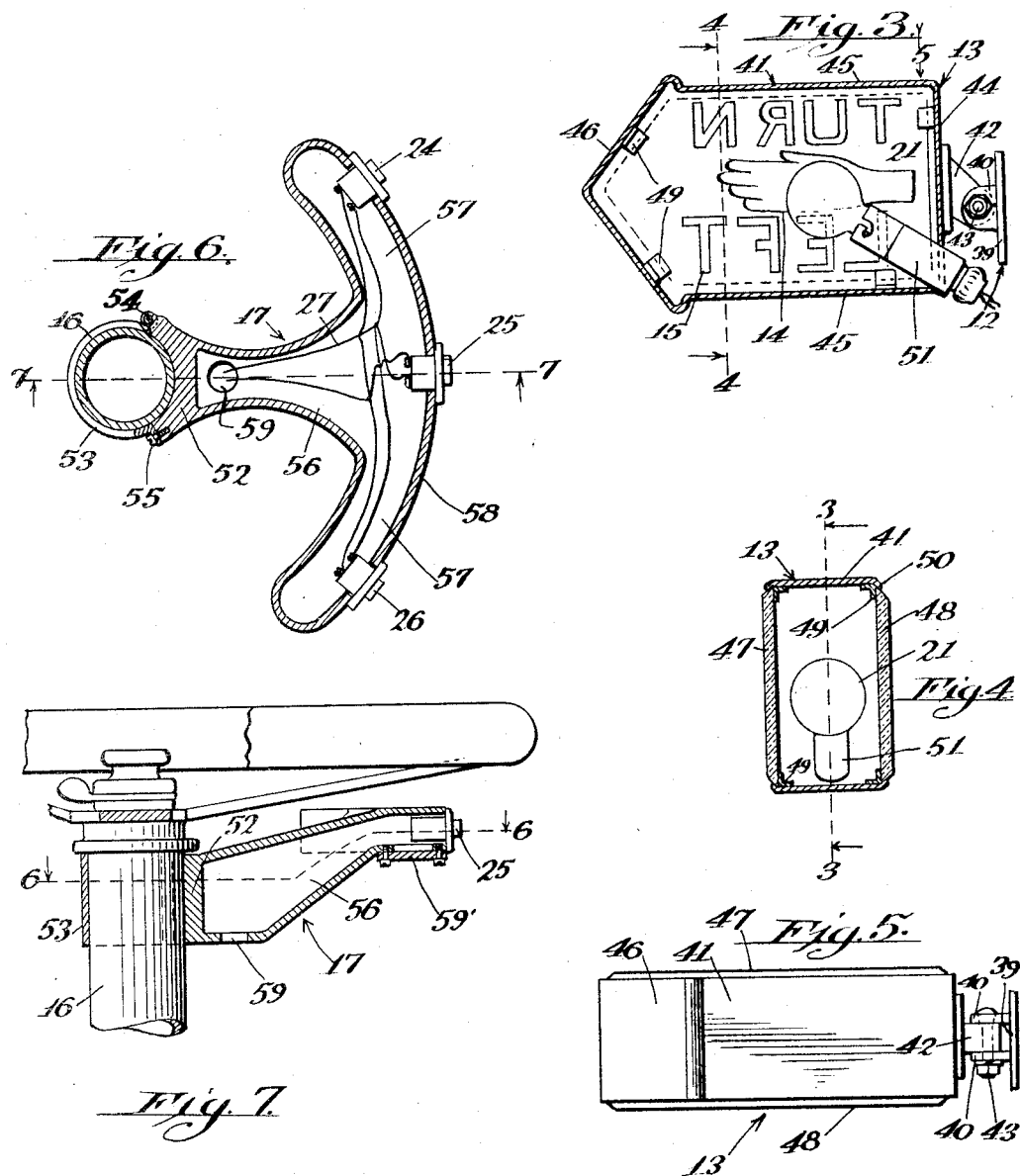

Patented Mar. 31, 1931

1,798,603

UNITED STATES PATENT OFFICE

SAMUEL P. HAYNES, OF PASADENA, AND HARRY BUTCHER, OF GLENDALE, CALIFORNIA

AUTOMOBILE TRAFFIC-SIGNAL SWITCH

Application filed May 25, 1927. Serial No. 194,078.

Our invention is an automobile traffic signal giving visible signals indicating right and left turns and, if desired, a stop or backing signal, or an audible signal such as sounding the horn.

An object of our invention is automobile traffic signals having indicating devices on the right and left hand sides of the vehicle with lights therein which may be illuminated to give the signals for the turns. These signals are visible from the front or rear of a vehicle.

Another object of our invention is the manner of supporting the switches for operating the signals on the steering post or column immediately adjacent the steering wheel whereby the driver may, by reaching with his finger from the wheel, engage a push button and give the signal desired. This allows the driver to maintain both hands on the wheel.

In constructing our invention we mount two light signals, one on each side of the vehicle, preferably adjacent the wind shield or forward of the driver. Each of these has a glass so that the lights may be visible at the front and the rear of the vehicle. On the left hand side there is a pointer with the words "Left turn" and at the right hand side a pointer with the words "Right turn". An arcuate bracket is mounted on the steering post and this has three switch buttons mounted therein, the bracket being attached to the post so that it may be located in different positions in reference to the steering wheel, for instance, it may be placed so it would be on the left hand side of the column, the right hand side, or towards the driver. Lamp circuits lead from a source of power through the switches to the lamp signals and, if desired, there is a stop or backing light signal connected to one of the three buttons, or a horn may be connected to the third button.

Our invention will be more readily understood from the following description and drawings, in which:

Figure 1 is a perspective view of our invention installed in a vehicle, looking from the back towards the front.

Figure 2 is a diagrammatic sketch illustrating suitable wiring and the connections to the buttons.

Figure 3 is a vertical section taken on the line 3—3 of Fig. 4 through one of the lamp signals.

Figure 4 is a section on the line 4—4 of Fig. 3 in the direction of the arrows.

Figure 5 is a plan view of one of the signal lamps taken in the direction of the arrow 5 of Fig. 3.

Figure 6 is a section on the line 6—6 of Fig. 7 in the direction of the arrows, through the switch bracket.

Figure 7 is a section on the line 7—7 of Fig. 6, the steering column being shown in elevation.

Reverting to the general construction of Fig. 1, the automobile body is designated generally by the numeral 11 and on the sides, preferably adjacent the wind shield, there are secured brackets 12 to which are connected signals 13. These signals have indicia 14 thereon in the form of a pointer, such as the hand, and also words 15, such as left turn and right turn.

On the steering column 16 there is secured a switch bracket, designated generally by the numeral 17, which has a plurality of push buttons mounted therein to give the signals.

The wiring hook-up for giving the signals is illustrated in Fig. 2. In this case the left hand signal is designated by the numeral 18 and the right hand signal by the numeral 19 and in addition there is also illustrated a third light 20 which may be used for a stop or a backing light. Each of these signals has a lamp, indicated as 21, 22 and 23, for the respective signals. The switch buttons are designated as 24, 25 and 26, each of these buttons being connected to a main lead 27 which is attached to a source of power 28, such as a storage battery, one side of the battery being grounded as indicated at 29. From the main leads there are circuits 30, 31 and 32, to the respective switches. To the right hand signal from the switch 24 there is a lead 33 to the lamp 22, this lamp having a ground lead 34. To the left hand signal 18 there is a lead 35 from the switch 26 to the lamp 21, this lamp having a ground lead 36. A lead 37 extends from the center button switch 25 to the lamp 23 of the stop or backing signal and this lamp has a ground connection 38.

The detail construction of our signals for the right and left hand turns is shown in Figs. 3, 4 and 5. The brackets 12 are secured to the side of the vehicle, each bracket comprising a plate 39 with ears 40 extending therefrom. The signal, designated generally by the numeral 13, comprises preferably a metallic frame 41 having a tongue 42 extending from the base and a clamping bolt 43 clamps this tongue to the ears 40. From the base 44 there are upper and lower sides 45 and outer sides 46 which come to a point, the shape from the front and rear elevations simulating an arrow. Glass plates 47 and 48 form the front and rear faces of the signal, these being held in place by internal brackets 49, and are engaged by inturned rims 50 on the base, top, bottom, and outside walls of the signal. The lamps are mounted on suitable sockets 51 which preferably enter through the base and are inclined. It is desirable to have the pointer 14 and the word indicias 15 on both the front and back plates of each signal so that persons behind and in front of the vehicle can readily interpret the signal given.

The switch bracket 17 is constructed substantially as follows, having reference particularly to Figs. 1, 6 and 7:

This bracket has a base 52 which is curved to conform to a cylindrical steering column and there is a strap 53 which is pivoted at 54 to one side of the base and attached to the other side by means of a clamp screw 55. Extending from the base there is a hollow arm 56 which, as illustrated in Fig. 7, is inclined upwardly and on the outer end of the arm there is a hollow arcuate segment 57. The three switches 24, 25 and 26, are illustrated as of the push button type and are mounted on the outer periphery 58 of the segment 57. The lead wires from the button switches may pass through an opening 59 in the hollow arm 56. A removable plate 59' allows access to the switches.

By this construction the bracket 17 may be positioned closely underneath the steering wheel, the upward incline of the bracket conforming substantially to the usual upward incline of the spokes of the wheel. In the position shown in Fig. 1 the push buttons are arranged in a convenient position for the driver to operate same with his right hand by reaching a finger downwardly from the steering wheel and if it is desired to maintain the signal for a time while the turn is being made, the driver may turn the wheel with his left hand, letting it slip through his right hand and holding the wheel when necessary by the right hand to shift the left hand to effect a new grasp on the steering wheel. If the driver prefers to operate the signals by his left hand, he may shift the bracket so that it is on the left hand side of the steering post, being in an opposite position to that shown in Fig. 1 and if he desires to have it in a position convenient for operation by fingers of both hands, he may locate the bracket with the switches either at the lower or upper part of the wheel, that is close to the driver or remote from him.

From the above construction it will be seen that the driver may readily give either a right or a left turn signal before he desires to give such turns and if he wishes to stop he may give the stop signal by pressing the proper button. As many automobiles are equipped with stop signals operated by the brakes, this stop signal may also be hooked-up with the foot brake or a backing light may be utilized instead of a stop light, the stop signal being given by an ordinary foot brake. It may be stated, however, that our system of signals contemplates that the wire 37 may be hooked to a connection to a horn or any other suitable light signal.

A characteristic feature of our invention is the control of the right and left turn signals on opposite sides of the vehicle by means of switches located adjacent the steering wheel and that our signal, being illuminated, is clearly visible by either day time or night and shows to following traffic as well as to pedestrians and traffic ahead of the vehicle.

Various changes may be made in the principles of our invention without departing from the spirit thereof, as set forth in the description, drawings and claim.

We claim:

In a traffic signal, a bracket having an arcuate base, a strap securing the base to the steering post of a vehicle, a hollow arm extending laterally from the base and being sloped relative to the axis of the post, a hollow arcuate section connected to the arm and having side branches extending laterally from said arm in opposite direction, the outer peripheral portion of such segment being part of a circle with the axis of the post at the center and the upper surface of said segment being adapted to be parallel to the rim of the steering wheel, a plurality of switches mounted in said segment, one being opposite the arm and two others adjacent the ends of the segment, electric lead wires from the switches extending through the segmental portion and through the hollow arm, there being an opening in said arm through which the wires lead, the segmental section having an opening in the bottom and a removable plate forming a closure for said opening and giving access to the switches.

In testimony whereof we have signed our names to this specification.

SAMUEL P. HAYNES.
HARRY BUTCHER.